United States Patent
Suhonen et al.

(10) Patent No.: US 9,175,169 B2
(45) Date of Patent: Nov. 3, 2015

(54) THERMALLY SPRAYED COMPLETELY AMORPHIC OXIDE COATING

(75) Inventors: Tomi Suhonen, VTT (FI); Tommi Varis, VTT (FI); Erja Turunen, VTT (FI); Simo-Pekka Hannula, VTT (FI)

(73) Assignee: Teknologian Tutkimuskeskus VTT (FI)

( * ) Notice: Subject to any disclaimer, the term of this patent is extended or adjusted under 35 U.S.C. 154(b) by 43 days.

(21) Appl. No.: 13/808,101

(22) PCT Filed: Jul. 1, 2011

(86) PCT No.: PCT/FI2011/050627
§ 371 (c)(1),
(2), (4) Date: Feb. 1, 2013

(87) PCT Pub. No.: WO2012/004454
PCT Pub. Date: Jan. 12, 2012

(65) Prior Publication Data
US 2013/0143037 A1    Jun. 6, 2013

(30) Foreign Application Priority Data

Jul. 9, 2010    (FI) ..................................... 20105789

(51) Int. Cl.
C09D 1/00    (2006.01)
B32B 15/20    (2006.01)
C23C 4/10    (2006.01)
C23C 4/12    (2006.01)

(52) U.S. Cl.
CPC . *C09D 1/00* (2013.01); *B32B 15/20* (2013.01); *C23C 4/10* (2013.01); *C23C 4/105* (2013.01); *C23C 4/124* (2013.01); *Y10T 428/26* (2015.01)

(58) Field of Classification Search
None
See application file for complete search history.

(56) References Cited

U.S. PATENT DOCUMENTS

| | | | |
|---|---|---|---|
| 5,059,095 A | * | 10/1991 | Kushner et al. ............ 416/241 B |
| 2003/0008764 A1 | | 1/2003 | Wang et al. |
| 2004/0253381 A1 | | 12/2004 | Branagan |
| 2006/0289405 A1 | * | 12/2006 | Oberste-Berghaus et al. .......... 219/121.47 |
| 2012/0017805 A1 | * | 1/2012 | Jordan et al. ............... 106/286.4 |

FOREIGN PATENT DOCUMENTS

| | | |
|---|---|---|
| EP | 0470457 A1 | 2/1992 |
| JP | 2004091269 A | 3/2004 |
| JP | 2005097722 A | 4/2005 |
| KR | 20000039445 | 7/2000 |
| KR | 20090125028 | 12/2009 |
| WO | WO2004016821 | 2/2004 |
| WO | WO2008049065 | 4/2008 |
| WO | WO2008049069 | 4/2008 |
| WO | WO2010005745 | 1/2010 |

OTHER PUBLICATIONS

Hannula et al. Current Applied Physics 9, 2009, S160-S166.*
Dent, A.H. et al, High velocity oxy-fuel and plasma deposition of BaTiO3 and (BA,Sr)TiO3, Materials Science and Engineering B, 2000, vol. 87, p. 23-30.
Leivo, J. et al, Influence of the elementary mixing scale of HVOF—sprayed coatings derived from nanostructured aluminosilicate/mullite feedstock, Surface & Coatings Technology, 2003, vol. 203, p. 335-344.

* cited by examiner

*Primary Examiner* — Vera Katz

(57) ABSTRACT

The present invention relates to a process of producing an oxide coating, wherein an oxide or oxide composite composition is manufactured, then heated and, finally, sprayed onto a substrate by a thermal spraying process into a completely amorphous coating. The invention also relates to such a completely amorphous coating and to a substrate equipped with such a coating.

14 Claims, No Drawings

THERMALLY SPRAYED COMPLETELY AMORPHIC OXIDE COATING

BACKGROUND OF THE INVENTION

1. Scope of the Invention

The present invention relates to completely amorphous oxide or oxide composite coatings as well as to a process for producing them, especially by using thermal spraying. The invention also relates to a substrate equipped with said coating.

2. Description of the Prior Art

Among the known solutions which are developed to protect surfaces, there are completely amorphous metal coatings and partly crystalline (partly amorphous) and completely crystalline oxide coatings.

U.S. publication 2004/0253381 describes the formation of such a partly crystalline metallic glass coating by heating an already finished metallic coating. The publications WO 2008/049065, WO 2008/049069 and WO 2010/005745, in turn, describe the generation of metal coatings by using processes which utilize heating, whereby the coatings can also become amorphous, depending on the process used.

The properties of the coatings belonging to these known groups differ clearly from the properties of the coatings of the present invention, and also from their manufacturing processes. Even a small fraction of crystalline material significantly changes the properties of a coating. However, in the processes used in the prior art, the crystallizing temperatures and the melting of the components are utilized in such a way that a completely amorphous coating is impossible to achieve. The aim in these has been to achieve only small changes in the crystallization degree, and thus small changes in the properties of the coatings.

Now it has been surprisingly discovered that by using simple processes it is possible to achieve completely amorphous coatings which also utilize the useful properties of the oxides.

BRIEF DESCRIPTION OF THE INVENTION

One aim of the present invention is to provide new types of coatings.

In particular, it is an aim of the present invention to provide completely amorphous oxide coatings.

Another particular aim of the present invention is to provide a new process for manufacturing oxide coatings, using which the coating will be completely amorphous.

Thus, the present invention relates to a process of producing an oxide coating, wherein an oxide composition or an oxide composite composition is manufactured and used to coat a substrate.

More specifically, the process according to the present invention is characterized by what is stated in the characterizing part of claim 1.

The coating according to the present invention is, in turn, characterized by what is stated in claim 7, and the coated substrate according to the invention is characterized by what is stated in claim 12. The different embodiments of the present invention are characterized by what is stated in claims 16-20.

The process according to the present invention contains formulating the composition, manufacturing the composite powder and thermally spraying the powder in such a way that the result is a completely amorphous oxide coating. The properties of said coatings differ considerably from the properties of crystalline coatings which have a corresponding composition, among others, regarding their electrical insulation capacity, their corrosion protection capacity as well as their capacity to resist wear. In addition, said completely amorphous coatings possess an elasticity which is typical of amorphous materials.

DETAILED DESCRIPTION OF THE PREFERRED EMBODIMENTS OF THE PRESENT INVENTION

The present invention relates to a process of producing an oxide coating, wherein an oxide or oxide composite composition is manufactured, which is heated and, finally, sprayed onto a substrate using a thermal spraying process into a completely amorphous coating.

Here the term "completely amorphous" means a structure which is 95-100% amorphous, which, however, preferably is 100% amorphous.

In the formulating of the oxide composite composition, theoretical thermodynamic and kinetic regularities are utilized which have been found to be good in connection with metal alloys. The powder is prepared to correspond to the target composition. This can be done for instance by using the powder manufacturing process described in U.S. publication 2003008764.

A completely amorphous oxide coating according to the present invention is produced by thermal spraying. Thermal spraying means a process according to which an oxide or an oxide composite, which is in the form of fine mist and which is melted completely or partly to a liquid state, is carried along with a gas flow and sprayed onto the surface of a substrate to be treated. Examples of thermal spraying are flame-spraying, arc-spraying, plasma-spraying, vacuum plasma-spraying, high-velocity flame-spraying and spraying by detonation. Preferably, such thermal spraying techniques are used in which the cooling rate, which is determined by the spraying process, is such that the driving force, which makes the melt solidify into an amorphous phase, is more powerful than the forces which generate crystalline phase(s), in which case the melt solidifies as completely amorphous. More preferably, high-velocity techniques are used, such as high-velocity flame-spraying, in particular the HVOF (high-velocity oxy-fuel) process.

A completely amorphous structure is generated during this coating process which utilizes thermal spraying when the material melts and solidifies onto the substrate material under a very high cooling rate, which preferably is $10^2$-$10^8$ K/s. Thus, a completely amorphous coating is achieved directly in one stage without additional stages which are associated with the known technology, which stages comprise a separate coating stage and subsequent melting cycles. At the same time, with the present invention it is possible to achieve even a thick coating which is amorphous throughout its entire thickness.

The present invention also relates to a completely amorphous oxide coating and a substrate which is coated with it, and which, according a preferred embodiment, is produced by using the process described above.

Preferably, the thickness of the coating according to the present invention is 20 µm-5 mm, most suitably 50 µm-2 mm.

The oxide coating can be generated from a metal oxide or from mixtures of oxides, i.e. composites which, preferably, comprise two or more metal oxides, or, more preferably, comprise two or more metal oxides the concentrations of which are chosen so that they correspond closely to the eutectic or eutectoid compositions of the oxide system, or comprise two or more metal oxides which are chosen so that the cooling rate of the composite is sufficient to generate an amorphous structure, and which composites most suitably are aluminium oxide-rich composites, such as $Al_2O_3$—$ZrO_2$—$Y_2O_3$.

With these composites, it is possible to modify the properties of the generated coating in the desired manner, especially by increasing the strength and the elasticity of the coating.

These oxide composites are chosen particularly from such composites which, when the above-mentioned thermal spraying processes are used, solidify during the coating process to become completely amorphous, i.e. 95-100% amorphous, but which coating, however, preferably is 100% amorphous.

It is not necessary for the composite composition to correspond completely to the eutectic or eutectoid composition, because the present invention has been demonstrated to work also for compositions which are close to the eutectic and eutectoid points, and for other corresponding compositions with which the rate of cooling is adequate for generating an amorphous structure.

For the above-mentioned example, i.e. the aluminium oxide-rich composite, $Al_2O_3$—$ZrO_2$—$Y_2O_3$, it is sufficient that the percentage of the aluminium oxide present is at least 40 vol-%. Most suitably, the composition is $Al_2O_3$-15-40 vol-% ($ZrO_2$-8 mole-% $Y_2O_3$).

In the vicinity of the eutectic and the eutectoid points, thermodynamics provides favorable conditions for the melted oxide composition to solidify into an amorphous state.

Oxides which are preferred to be used in the present invention are transition metal oxides, alkali metal oxides and alkali earth metal oxides, which can be used alone or in the form of their above-mentioned composites. Particularly preferred are transition metal oxides and their composites, especially their composites.

Aluminium oxide alone, as the only oxide, is not well suited to be a coating in the present invention. In particular, traditional glass-generating oxides, i.e. oxides which belong to the group $B_2O_3$, $SiO_2$, $GeO_2$, $P_2O_5$, $As_2O_3$, $Sb_2O_3$, $In_2O_3$, $Tl_2O_3$, $SnO_2$, $PbO_2$ and $SeO_2$, are not used in the present invention because of their low suitability for generating completely amorphous coatings.

The above-mentioned oxides, which are suitable for the invention, can be used in the form of completely amorphous coatings, particularly at temperatures which are up to 1000° C. According to the present invention, an aluminium-rich composition, such as $Al_2O_3$—$ZrO_2$—$Y_2O_3$, is suitable for use in the form of completely amorphous coatings at a temperature which is up to 950° C., because the crystallizing temperature of the example composition in question is measured to be approximately 950° C. (DSC run in air atmosphere, heating rate 10° C./s).

A coating according to the present invention can be used for treating all kinds of surfaces, especially for treating such surfaces which are exposed to corrosion and abrasion. Examples of these are metal and concrete surfaces of buildings, bridges, columns and vehicles. The surface is also particularly suitable for treating such surfaces which are exposed to high temperatures or which are supposed to require a good electrical insulation capacity.

According to a preferred embodiment of the present invention, a completely amorphous coating, according to the invention, is added to provide an electrically insulating coating on a range of surfaces. In these coatings, it is possible to use all the above-mentioned oxides, i.e. transition metal oxides, alkali metal oxides and alkali earth metal oxides and composites of these, especially aluminium oxide-rich composites. According to the known technology, for instance aluminium oxide is generally used in these.

The dielectric breakthrough voltage of thermally sprayed aluminium oxide coatings (which mostly have a crystalline structure) is typically 10-15 kV/mm. With completely amorphous aluminium oxide-rich composite oxide compositions, for instance with $Al_2O_3$—$ZrO_2$—$Y_2O_3$, it is possible to achieve values of even up to 30 kV/mm. The dielectric breakthrough voltage of a composition which has a corresponding composition but which is partly crystalline is substantially lower (appr. 10 kV/mm).

According to another preferred embodiment of the invention, a completely amorphous coating, according to the present invention, is added to provide a thermal insulation coating on a range of surfaces. It has been discovered that the thermal insulation capacity is also improved when these coatings, according to the present invention, are used, compared with a situation where the coating is carried out using a crystalline or partly crystalline composition.

In these coatings, it is possible to use any of the above-mentioned oxides, i.e. transition metal oxides, alkali metal oxides and alkali earth metal oxides and composites of these, especially aluminium oxide-rich composites. For instance $Al_2O_3$—$ZrO_2$—$Y_2O_3$ generates a very good thermal insulator at temperatures which are up to 950° C.

According to a third preferred embodiment of the invention, a completely amorphous coating, according to the invention, is added to provide a corrosion-protection coating on a range of surfaces. Examples of these surfaces are metal and concrete surfaces of buildings, bridges, columns and vehicles. All the above-mentioned oxides, i.e. transition metal oxides, alkali metal oxides and alkali earth metal oxides and composites of these, especially aluminium oxide-rich composites, can be used in these coatings.

The structures of known aluminium oxide-based thermally sprayed (at least partly crystalline) coatings comprise mainly the gamma phase of aluminium oxide, which reacts readily with water, thus forming aluminium hydroxide. Consequently, aluminium oxide-based coatings are not typically used in applications where water gets in contact with the coating. However, a completely amorphous oxide coating (even in an aluminium oxide-rich form) possesses exceptional anti-corrosion properties, compared with a crystalline or partly crystalline coating.

According to a fourth preferred embodiment of the invention, a completely amorphous coating of the invention is added to provide a wear-resistant coating on a range of surfaces. Examples of these surfaces are metal and concrete surfaces of buildings, bridges, columns and vehicles. All the above-mentioned oxides, i.e. transition metal oxides, alkali metal oxides and alkali earth metal oxides and composites of these, especially aluminium oxide-rich composites, can be used in these coatings. Such a completely amorphous oxide coating possesses exceptional mechanical properties compared with a crystalline or a partly crystalline coating. It was discovered that, among others, the abrasion resistance of a known aluminium oxide coating (ASTM G65 D test) could be improved with a completely amorphous structure, especially with $Al_2O_3$—$ZrO_2$—$Y_2O_3$, which was achieved by alloying.

According to a particularly preferred embodiment of the invention, a completely amorphous coating of the invention is added to a range of surfaces, to provide coatings which generate two or more of the following: electrical insulation, thermal insulation, corrosion protection and wear resistance. All the above-mentioned oxides, i.e. transition metal oxides, alkali metal oxides and alkali earth metal oxides and composites of these, especially aluminium oxide-rich composites, such as $Al_2O_3$—$ZrO_2$—$Y_2O_3$, can be used in these coatings.

The invention claimed is:

1. A process of producing an oxide composite coating which is completely amorphous, said oxide composite coating comprising an oxide composite containing an aluminium oxide and at least one further metal oxide, whereby the metal oxide is a transition metal oxide, alkali metal oxide, alkali earth metal oxide, or a combination thereof, wherein the oxide composite coating is completely amorphous, wherein an HVOF (high-velocity oxy-fuel) process is used to spray the oxide composite to form the oxide composite coating, wherein a dielectric breakthrough voltage of a spray coating can achieve values from greater than 15 kV/mm to up to 30 kV/mm, wherein an oxide composite composition is manufactured, said process comprising the steps of;

coating, a substrate, whereby the coating is carried out by manufacturing the oxide composite composition, wherein said wherein said oxide composite composition is heated and sprayed onto the substrate by a thermal spraying process into a completely amorphous coating, wherein the oxide composite composition is manufactured from an aluminium oxide and at least one further metal oxide, whereby the metal is a transition metal, alkali metal or alkali earth metal, and in that a HVOF (high-velocity oxy-fuel) process is used in the spraying.

2. The process according to claim 1, wherein the composition is heated before spraying in such a way that it melts at least partly.

3. The process according to claim 1, wherein during the spraying, the cooling rate $10^2$-$10^8$ K/s is such that the driving force, which makes the melt solidify into an amorphous state, is more powerful than the forces which generate crystalline phase(s), whereby the melt solidifies into a completely amorphous state.

4. The process according to claim 1, wherein the oxide or oxide composite composition is manufactured from $Al_2O_3$-$ZrO_2$-$Y_2O_3$.

5. The process according to claim 1, wherein the composition is sprayed onto a substrate as a layer having a thickness of 20 μm-5 mm.

6. An oxide composite coating which is completely amorphous, said oxide composite coating comprising an oxide composite containing an aluminium oxide and at least one further metal oxide, whereby the metal oxide is a transition metal oxide, alkali metal oxide, alkali earth metal oxide, or a combination thereof, wherein the oxide composite coating is completely amorphous, and wherein a HVOF (high-velocity oxy-fuel) process is used to spray the oxide composite to form the oxide composite coating, wherein a dielectric breakthrough voltage of a spray coating can achieve values from greater than 15 kV/mm to up to 30 kV/mm.

7. The coating according to claim 6, wherein concentrations of the oxides are selected to correspond to an eutectic or eutectoid compositions of the oxide system.

8. The coating according to claim 6, wherein the coating is an aluminium-oxide-rich composite having components with concentrations which are an eutectic or eutectoid compositions of the oxide system, and which most suitably comprises at least 40% by volume of aluminium oxide.

9. The coating according to claim 6, wherein the coating is $Al_2O_3$-$ZrO_2$-$Y_2O_3$.

10. The coating according to claim 6, wherein it is maintained at a temperature which is up to 1000 ° C.

11. A substrate coated with an oxide composite comprising an oxide composite manufactured from an aluminium oxide and at least one further metal oxide, whereby the metal oxide is a transition metal oxide, alkali metal oxide, alkali earth metal oxide, or a combination thereof, wherein a coating is completely amorphous and made by spraying the oxide composite on to a substrate by a HVOF (high-velocity oxy-fuel) process, and wherein a dielectric breakthrough voltage of a spray coating can achieve values from greater than 15 kV/mm to up to 30 kV/mm.

12. The coated substrate according to claim 11, wherein the coating is formed from an aluminium oxide-rich composite.

13. The coated substrate according to claim 11, wherein a thickness of the coating is 20 μm-5 mm.

14. An oxide composite coating comprising:
an aluminium oxide and at least one further metal oxide, wherein the metal oxide is selected from the group consisting of a transition metal oxide, alkali metal oxide, or alkali earth metal oxide, or a combination thereof,
wherein the aluminium oxide and the at least one further metal oxide form a completely amorphous coating when applied to a substrate, wherein a dielectric breakthrough voltage of a spray coating can achieve values from greater than 15 kV/mm to up to 30 kV/mm.

* * * * *